(No Model.)
C. F. A. H. BAGOT.
MANUFACTURE OF RESILIENT OR PNEUMATIC TIRES.
No. 603,161. Patented Apr. 26, 1898.
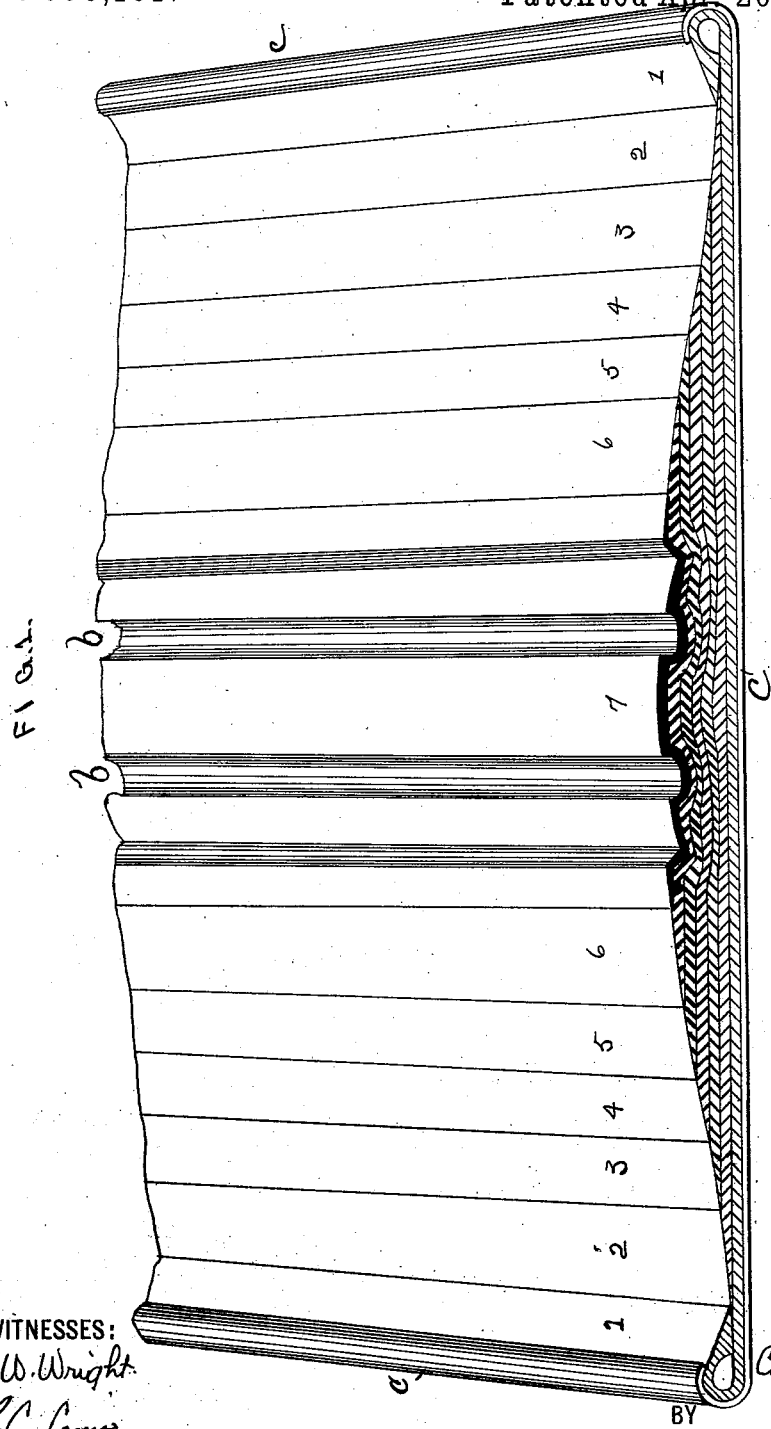
WITNESSES:
P. W. Wright
S. C. Connor
INVENTOR
Chas. F. A. H. Bagot
BY
Howlar and Howlar
ATTORNEYS.

UNITED STATES PATENT OFFICE.

CHARLES F. A. H. BAGOT, OF LONDON, ENGLAND, ASSIGNOR TO THE BAGOT PNEUMATIC TYRE COMPANY, LIMITED, OF SAME PLACE.

MANUFACTURE OF RESILIENT OR PNEUMATIC TIRES.

SPECIFICATION forming part of Letters Patent No. 603,161, dated April 26, 1898.

Application filed June 22, 1897. Serial No. 641,821. (No model.)

*To all whom it may concern:*

Be it known that I, CHARLES FITZ ROY ALEXANDER HALLIFAX BAGOT, a subject of the Queen of Great Britain and Ireland, residing at 59 Cadogan Square, in the city of London, England, have invented certain Improvements in the Manufacture of Resilient or Pneumatic Tires or Tire-Coverings for the Wheels of Bicycles and other Velocipedes or Vehicles, of which the following is a specification.

The object of my invention is to produce a pneumatic or resilient tire for bicycles or other velocipedes or vehicles which is very durable and which maintains a practically uniform small width of surface in contact with the road when the weight is upon it.

My said invention is the outcome of investigations which I have made as to the nature of the skin of the sole of the human foot. Broadly speaking, the human skin consists of the epidermis, scarf-skin, or cuticle, forming an external covering of a very elastic and protective nature for the true skin, called the "dermis," "cutis," or "corium." The thickness of the epidermis varies from one two-hundredth to one-tenth of an inch, according to the amount of protection which the delicate and sensitive corium requires in different localities. The greatest thickness of the epidermis is found at the soles of the feet.

By proceeding as hereinafter described I produce in rubber the closest possible imitation of the formation of the skin at the sole of the human foot in so far as the resilient, tough wearing, and protective qualities of the latter are concerned.

For all practical purposes as regards my present invention the corium, in spite of its greater comparative thickness, may be taken as a single homogeneous inner layer of even consistency, and the epidermis, with its many layers of stratified cells of minutely-graduated hardness superimposed on each other, may be taken as consisting of six main strata from the softest and innermost "mucous" stratum to the hardest and outermost "horny" stratum. In all, therefore, for the practical purposes of my present invention I may subdivide the skins at the sole of the human foot into seven strata or layers of graduated degrees of hardness.

It is obvious that I can apply my invention to the manufacture of rubber pneumatic tires of either the "single-tube" or the "double-tube" kinds. Assuming, for example, that the outer cover of a double-tube tire—that is, one with a separate air-chamber—is to be made of seven degrees of graduated vulcanization. Then a mass of properly cleaned and prepared "dough" of the best rubber is divided into seven equal masses. Sulfur in any suitable form, such as the form known as "flowers of sulfur," is then added in varying quantities to each of the seven masses of rubber dough. For instance, let the several masses of dough be severally distinguished by the numerals 1, 2, 3, 4, 5, 6, and 7. Then if to No. 1 sulfur be added in the proportion of, say, ten per cent., by weight, No. 2 will have an addition of twelve per cent., No. 3 of fourteen per cent., No. 4 of sixteen per cent., No. 5 of eighteen per cent., No. 6 of twenty per cent., and No. 7 of twenty-two per cent., of sulfur. The sulfur may of course be added to the rubber dough in any required percentage, by weight, according to the degree of hardness ultimately desired in the completed outer cover; but whatever additions of sulfur be made the amounts throughout the several masses of dough should vary by a common percentage, preferably by two or three per cent., by weight, of sulfur. The several masses of rubber dough and sulfur are then each separately passed through suitable calenders or other efficient mixing-machines as many times as necessary to thoroughly mix together the rubber dough and sulfur contained in each mass. Each of these masses is then rolled, or otherwise made by any convenient process, into sheets of the required thickness, breadth, and length. Such sheets so made will after this process be of such a nature and consistency as to be easily handled and yet capable of being shaped or molded in the usual manner to any desired form or pattern.

All the sheets which go to form any given outer cover should be of the same thickness, and they are cut into strips of the same length; but only the strips cut from the sheets Nos. 1 and 2 will be of the same breadth. The remainder—namely, the strips cut from the sheets Nos. 3, 4, 5, 6, and 7—will be of varying breadths from strip No. 7, the narrowest, to strip No. 3, the broadest, of this series. Strips Nos. 1 and 2 alone will be of the full breadth of the outer cover of the tire. The strips so made are then placed, either by hand or by machinery, upon a molded mandrel of drum or other suitable shape in the following order, namely: No. 7 (which contains the greatest quantity of sulfur) is first placed around the mandrel. No. 6 is then placed on or over No. 7, No. 5 over No. 6, and so on until No. 1 (the strip which contains the least amount of sulfur) is last placed over the other dough strips around the mandrel. The whole of the strips thus superimposed are then compressed or bound to the mandrel or other suitable mold by strips of canvas or other usual or suitable means, so as to force the requisite number of such strips to take the shape or configuration of the mold in question. Care must, however, be taken that in this compressing or binding process sufficient allowance is made for the alteration in the consistency of the rubber resulting under the process of curing or vulcanization. The mandrel or mold thus surrounded by the dough strips held together by the canvas wrappings or other suitable means of compression or retention is then subjected to the process of curing or vulcanization in the usual manner at a temperature of, say, 300° Fahrenheit, for a period of time which is determined by the degree of hardness required in the outermost or "tread" strip of the completed tire. On emerging from this process of curing or vulcanization the whole of the strips will be so completely joined to one another as to form a solid and cohesive mass, and in this solid cohesive mass, although the vulcanization will be imperceptibly graduated in degrees of hardness throughout its entire thickness, there will be presented nothing whatever in the nature of a hardened distinguishable band or rib.

Although in the foregoing description the details of manufacture of the outer cover of a tire of seven degrees of graduated vulcanization are given, it is manifest that a tire of any lesser or of any greater number of degrees of graduated vulcanization may be similarly made by the same process of manufacture. Manifestly, also, whether the tire in question be destined for the "wired-on" or the "clencher" or any other method of rim attachment, the process of graduating the vulcanization of the outer cover of the tire will be in every case identically the same.

With reference to the mandrel of drum or other suitable shape above named its grooving and configuration are so cut or turned that a mold is formed according to the tire to be produced. For example, with what is known as a "Bagot" tire of my Patent No. 585,615, dated June 29, 1897, the tread or surface to come in contact with the road is struck with a radius (in cross-section) equal to one-half the radius (in cross-section) of the periphery of the outer cover itself as the latter would appear in its distended condition when fully inflated with air. By this means an outstanding eccentric tread-arc is formed, the terminals of which abut tangentially against buttress-ridges shaped in the main portion of the outer cover. By this construction the tire when under pressure is caused to bulge at its sides close to the rim of the wheel instead of spreading or splaying over the ground. The tread-arc of the tire is further provided with two parallel grooves one-half of an inch apart and of about one-sixteenth of an inch in width and in depth. Each of these grooves, owing to the mathematical formation of the tread-arc, in conjunction with the system of graduated vulcanization used in the construction of the whole outer cover of the tire according to this invention, exerts so strong an automatical gripping action on the road-surface under angular pressure, such as is produced in describing curves, as to entirely obviate the possibility of "skidding" or side slipping.

The view in the accompanying drawing is a sectional perspective view, drawn to an enlarged scale, of a Bagot outer tire, the successive layers of varying degrees of hardness being indicated by numbers 1, 2, 3, 4, 5, 6, and 7. In the case illustrated layers 1 and 2 are not shown as of the same width. C indicates a fabric lining, and $b\ b$ are the grooves adjacent to the tread, as before mentioned.

Advantages of my invention are as follows, namely: first, that the resiliency of the outer cover itself, and consequently also the resiliency of the complete tire, is greatly increased; second, that this increased resiliency renders the outer cover of the tire *ipso facto* less liable to be punctured; third, that since when applied to the Bagot tire the said tire when under pressure bulges on each side close to the rim of the wheel and does not spread or splay over the road an exceedingly narrow normal tread is permanently maintained, and obviously the speed properties of the tire are thereby very greatly increased through reducing friction and road-clinging to an almost vanishing point.

I claim as my invention—

The manufacture and production of tires or tire-coverings by first preparing several mixtures of rubber and sulfur with varying proportions of sulfur and then forming them into layers or strips, then applying the said layers or strips of such different mixtures one upon the other to a mold or mandrel so that the layer or strip which, in the finished tire, is outermost, contains most sulfur the other layers or strips being applied in the order according to the amount of sulfur they contain that containing least sulfur being last applied, and then subjecting the whole to a simultaneous process of vulcanization.

In testimony whereof I have signed my name to this specification in the presence of two subscribing witnesses.

C. F. A. H. BAGOT.

Witnesses:
RUDOLPH CHARLES NICKOL,
WM. JOHN WEEKS.